United States Patent [19]

Huboi et al.

[11] 3,790,275

[45] Feb. 5, 1974

[54] METHOD AND APPARATUS FOR SENSING RADIATION DERIVED FROM INFORMATION BEARING MEDIA

[75] Inventors: Robert W. Huboi, Webster; Osmond F. Palmer, Rochester; Edward M. Waz, Hilton, all of N.Y.

[73] Assignee: Eastman Kodak Company, Rochester, N.Y.

[22] Filed: Mar. 24, 1972

[21] Appl. No.: 237,940

Related U.S. Application Data

[63] Continuation-in-part of Ser. No. 67,331, Aug. 27, 1970, abandoned.

[52] U.S. Cl. .............. 355/68, 250/209, 250/214 P, 356/203, 356/206
[51] Int. Cl. ............................................ G03b 27/76
[58] Field of Search. 250/209, 214 P; 356/202, 203, 356/206; 355/68, 67, 35, 38

[56] References Cited
UNITED STATES PATENTS

| | | | |
|---|---|---|---|
| 3,469,915 | 9/1969 | Thaddey | 355/38 |
| 3,523,728 | 8/1970 | Wick | 355/38 X |
| 3,232,192 | 2/1966 | Stimson | 95/10 CT |
| 3,563,143 | 2/1971 | Petersen | 95/10 CT |
| 3,690,765 | 9/1972 | Richard | 356/202 X |

*Primary Examiner*—Samuel S. Matthews
*Assistant Examiner*—Richard A. Wintercorn

[57] ABSTRACT

Method and apparatus for sensing radiation derived from an image or scene on information bearing media or originals so that the original, which may take the form of a negative or positive, may be appropriately classified and be printed (or reproduced) onto a record media or photosensitive copy material. In an illustrative embodiment of this invention, the apparatus includes a radiation sensitive assembly having a first radiation sensitive element for sensing the peripheral portion of the original and a second radiation sensitive element responsive to radiation derived from the subject or centrally disposed portion of the original. Further, the peripheral or first element includes a first radiation sensitive device for receiving radiation from a first or upper portion of the peripheral portion corresponding to the background of the scene on the original and a second radiation sensitive device for sensing radiation derived from a corresponding second or lower foreground portion of the scene on the original. First and second signals are developed by the first and second radiation sensitive devices, respectively. The second radiation sensitive element includes a plurality of radiation sensitive devices each responsive to radiation derived from a discrete sub-portion of the subject or centrally disposed portion of the original to produce a corresponding plurality of third signals. The plurality of third signals derived from the second radiation sensitive element are applied to an auctioneering circuit for providing a selected third signal indicative of that discrete sub-portion of the centrally disposed or subject portion on having the highest density. The first, second and selected third signals are applied to apparatus for producing first, second and third classification signals indicative of backlighted, normal or frontlighted scenes. The first and second signals are also applied to apparatus for deriving an exposure control signal corresponding to one of the first, second and third classification signals in accordance with the characteristics of the first and second signals. The original is reproduced under the control of the selected exposure control signal.

9 Claims, 3 Drawing Figures

3,790,275

PATENTED FEB 5 1974

ROBERT W. HUBOI
OSMOND F. PALMER
EDWARD M. WAZ
INVENTORS

BY Joseph F. Breimayer
W. H. J. Kline
ATTORNEYS

METHOD AND APPARATUS FOR SENSING RADIATION DERIVED FROM INFORMATION BEARING MEDIA

CROSS REFERENCE TO RELATED APPLICATIONS

This is a continuation in part pf my earlier filed application Ser. No. 67,331, filed Aug. 27, 1970 now abandoned.

Reference is made to U.S. Patent Application Ser. No. 43,879, now U.S. Pat. No. 3,708,676, entitled APPARATUS AND METHOD FOR CLASSIFYING AN INFORMATION BEARING MEDIA, filed in the names of Robert W. Huboi, Osmond F. Palmer and Bradley D. Rising.

BACKGROUND OF THE INVENTION

1. Field of the Invention

The present invention relates to photographic printing apparatus and more particularly, to an exposure controlling arrangement for such apparatus.

2. Description of the Prior Art

There have been problems in printing originals or information bearing media onto sensitized material such as photographic printing paper. For the sake of discussion, the original or information bearing media may be considered to be divided into a subject portion which may be centrally disposed of the original and a peripherally disposed background portion. When reproducing or printing the original onto the sensitized material, it is preferable that the subject portion be correctly exposed for both color and density even if this procedure results in improper exposure of the peripheral portion. In the prior art, the density of the original has been determined by illuminating the original and measuring the average transmission of the entire original, i.e., large area transmission density (LATD), to provide signals indicative of the exposure density and also the color balance of the original to be reproduced. This has frequently resulted in the wrong exposure and/or color balance of the subject portion of the reproduced print, because the background or foreground is significantly different in density or spectral dsitribution. This phenomena is known in the art as "subject failure." In the above-identified application to Huboi, Palmer and Rising, an apparatus and method are disclosed for measuring the density of an original. More specifically, there is disclosed apparatus including radiation sensitive apparatus for measuring the transmission density from a distinct peripheral background portion of the original and for measuring the density of the distinct central or subject portion of the original. More speifically the radiation sensitive apparatus may illustratively include a plurality of radiation sensitive devices for measuring and providing a plurality of signals indicative of the density of discrete sub-portion of the subject portion of the original. The signals derived from the radiation sensitive devices are applied to an auctioneering circuit which operates to provide a signal indicative of the radiation transmitted or redirected from a discrete sub-portion of the subject portion of the original having the highest density. The radiation sensitive apparatus may also include a further radiation sensitive device positioned to receive the radiation transmitted by the background peripheral portion of the original to develop a signal indicative of the average density of the peripheral background portion of the original. The signals derived from the radiation sensitive device responsive to the peripheral portion and from the auctioneering circuit are applied to a coefficient summing amplifier or circuit to provide a signal indicative of the density classification and/or color correction to be made in reproducing or printing the original.

Though the apparatus and method described in the above-identified application provides for the density classification of originals to thereby permit the satisfactory reproduction of the original in many instances, there are originals or negatives whose image content does vary from the normal and does present scenes which are difficult to classify. Generally, originals may present abnormal scenes which may be generally placed into two general categories. First, originals may be exposed to scenes which are backlighted such as portraits or outdoor scenes have a bright sky in the upper portion. The first type of scene usually requires a very low classification, i.e., the printer exposure control, which is based on LATD, must be corrected to achieve a density balance that is lighter than normal. To achieve a low classification, the exposure may be reduced in terms of length and/or intensity of exposure. However, if such first scenes are measured by the above-identified radiation sensitive apparatus, the maximum density of the subject portion that is measured may relate to the upper or sky portion of the scene rather than the subject or centrally disposed portion of the scene. Thus, the apparatus would provide a signal indicative of a high classification because the signal indicative of the maximum density would be of too high a value. Thus, the radiation sensitive apparatus does not compensate for the density subject failure of this type of scene, but in fact provides a classification of an opposite nature to thereby aggrevate the density subject failure problem.

The second type of scene which produces occasional errors in the above-described method of density classification is a front lighted scene wherein extremely high brightness contrast between the subject area and a deeply shaded or dark background portion exists. Originals of such scenes are not normally given sufficient exposure because the classification coefficients used in the above-described apparatus are derived as a compromise between the conflicting, extreme demands required by the front lighted scenes and the backlighted scenes. The high contrast, front lighted scenes require high density classification, i.e., additional exposure, to provide the correct, opposite relationship between the upper and lower perimetrical portions of the original. An example of the second type of scene is provided by those originals taken at night or indoors with a flash wherein the distant or upper background is relatively dark or of low brightness and where the foreground or lower background is illuminated with high brightness.

SUMMARY OF THE INVENTION

It is therefore an object of this invention to distinguish between and provide appropriate correction in the printing or reproduction of originals having scenes with first and second portions of differing density.

It is a further object of this invention to measure the density of the upper and lower portions of an original and to effect the relative density and/or color correction in the printing process dependent upon the type of scene viewed.

These and other objects are accomplished in accordance with the teachings of this invention by providing a method and apparatus for measuring the density radiation modulation of selected portions of an original. Such apparatus controls the reproduction on copy material of images or scenes on information bearing media or originals in a copying machine in accordance with the degrees of radiation modulation, or densities, of a plurality of discrete sub-portions of a distinct, central, subject portion of the image and with the degrees of radiation modulation, or densities, of first and second portions of a distinct peripheral portion of the image. The apparatus of this invention includes a radiation source for directing radiation on the image, radiation sensitive means positioned to receive the radiation redirected from the image and responsive to radiation redirected from the first and second portions of the peripheral portion for producing first and second signals, respectfully, and responsive to the radiation redirected from the plurality of discrete sub-portions of the central subject portion for producing a plurality of third signals, and a reproduction control responsive to the first, second and third signals for controlling the reproduction of the image on copy material in a copying machine in accordance with the degree of radiation modulation of the respective portions of the image indicated by the first, second and third signals. More specifically, the reproduction control includes a selector for selecting the one of the third signals indicative of a degree of radiation modulation or density of a selected sub-portion that bears a predetermined relationship to the degrees of radiation modulation of the other discrete sub-portions.

In an illustrative embodiment of this invention, the third signals developed by radiation sensitive apparatus of the subject portion are applied to means for providing selected third signal indicative of the discrete sub-portion of maximum density within the subject portion of the original. Image classification apparatus responds to the first and second signals for classifying the image as a backlighted image, a normally illuminated image, or a frontlighted image, and the reproduction control responds to the image classification and the first, second and third signals to produce a reproduction control signal for reproducing the classified image. More particularly, first, second and third coefficient amplifiers receive signals derived from the first and second parts of the peripheral portion of a radiation sensitive assembly, and the auctioneering circuit. The first, second and third coefficient summing amplifiers are provided with coefficients to provide the appropriate classification respectively for a backlighted scene or image, a normal scene and a front lighted scene. A signal related to one of the output signals derived from these coefficient summing amplifiers may be selectively applied to a printer or other reproducing apparatus dependent upon the signal derived from the background function circuit.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
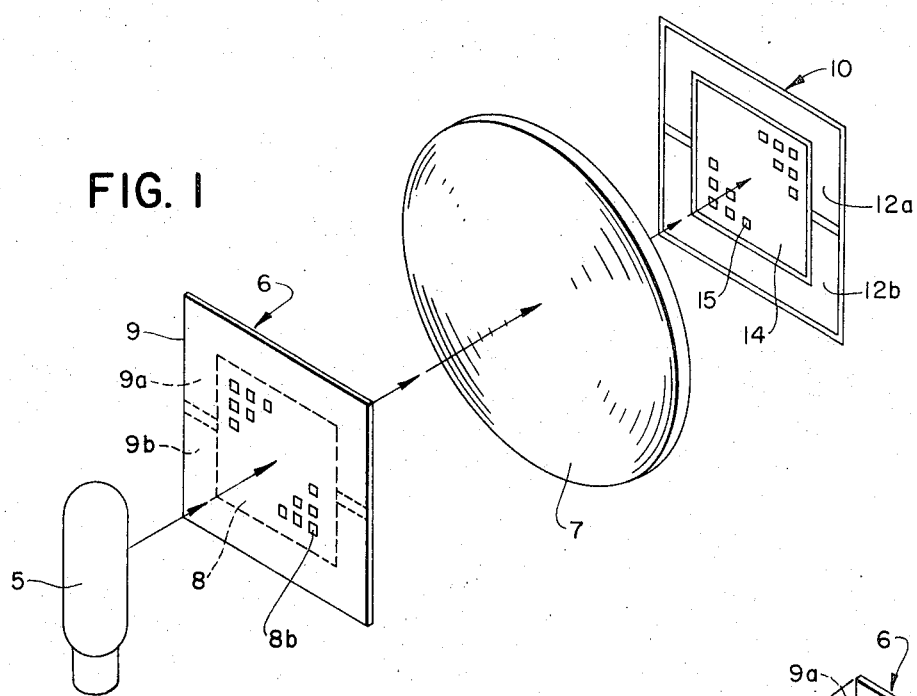
FIG. 1 is a view in partial perspective of the projection of an original on the radiation sensitive apparatus of the present invention.
Figure 2:
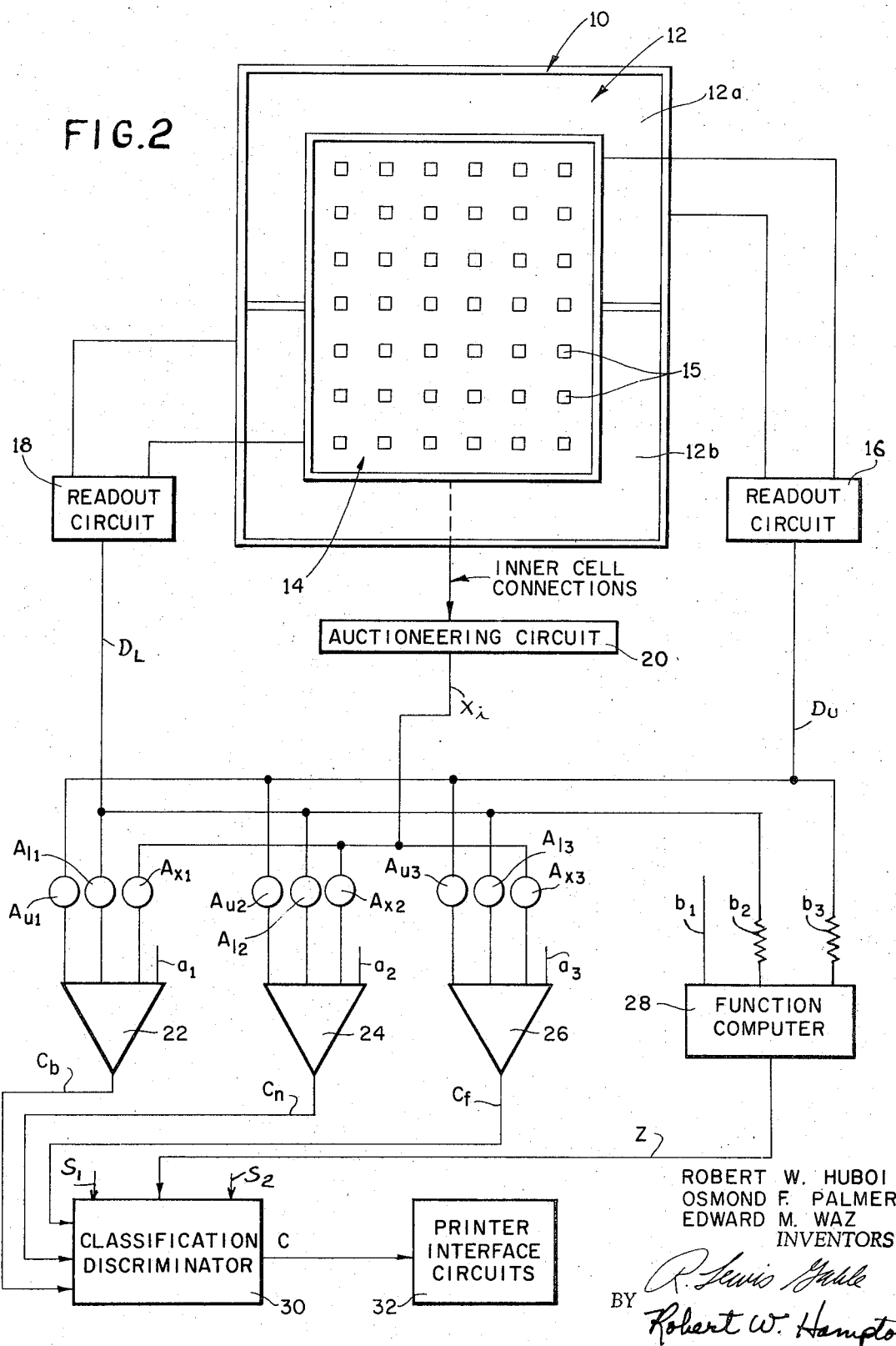
FIG. 2 is a schematic diagram of the radiation sensitive apparatus and the circuitry for interpreting the signals derived therefrom in accordance with the teachings of this invention.

Referring now to FIG. 1, there is shown radiation sensitive apparatus 10 disposed to receive a radiation image, which is derived from radiation emitted by a radiation source 5, transmitted through or directed upon the original 6 to be reproduced and focused or redirected by a suitable lens 7 thereon. The radiation sensitive apparatus 10 is designed to be sensitive to radiation derived from a centrally disposed subject portion 8 having a plurality of distinct sub-portions 8a (only a few of which are shown by the dotted lines in FIG. 1) and from the distinct peripheral portion 9 of the original 6 and to provide signals indicative thereof. Turning now to FIG. 2, the radiation sensitive apparatus 10 includes a perimetrical or peripheral radiation sensitive element 12 for receiving radiation derived from the peripheral portion 9 of the original. In an illustrative embodiment of this invention, the apparatus 10 shown in the drawing may be used with a photographic printer which receives classification signals in a manner to be described, to thereby control the exposure of a radiation sensitive medium. In considering a large number of originals or negatives, such negatives have a composition arranged in well recognized categories. In evaluating an original (as shown in FIG. 1), the original 6 may be considered to have the centrally disposed subject portion 8 which is normally considered to include the highlight or point of interest of the original, and the peripheral portion 9. A further division of the peripheral portion 9 may result in separately considering the upper or first portion 9a as distinct from the lower or second portion 9b. It may be understood when using the terms upper and lower to describe various parts of the peripheral portion 9 of an original 6, that the point of interest is taken with respect to the manner in which the general public will use their camera to take a picture of the scene. For example, in outdoor scenes, the upper or first portion of the peripheral portion would typically be the background, e.g., the sky, whereas the lower or second portion of the peripheral portion may be of the landscape in the foreground relatively close to the picture taker. In accordance with the teachings of this invention, this apparatus distinguishes between the upper background and lower foreground portions of the peripheral portion of the original with respect to the density and/or spectral distribution of the original to thereby improve the reproduction of the original onto a radiation sensitive medium. The first, peripheral, background radiation sensitive element 12 of the radiation sensitive apparatus 10 is divided as shown in FIG. 2 into an upper radiation sensitive device 12a and into a lower radiation sensitive device 12b to provide electrical signals indicative of the integrated or average radiation directed thereon from the corresponding upper background or first and lower foreground or second portions of the peripheral portion of the original. Further, the radiation sensitive apparatus 10 includes a second, centrally disposed radiation sensitive element 14 for receiving radiation from the subject or central portion of the original. As shown in FIGS. 1 and 2, the second radiation sensitive element 14 may in one illustrative embodiment be comprised of a plurality of radiation sensitive devices 15 disposed in an array to sense radiation derived from a plurality of discrete sub-portions (8a, FIG. 1) of the subject portion 8 of the original 6 to provide a corresponding plurality of signals indicative thereof. Electrical connections are made to the devices 15 in a manner well known in the art to provide individual signals from each of the radiation sensitive devices 15. Though there has been illustratively shown in the drawings a radiation sensitive apparatus 10 taking the form of an image reading mosaic array whose various radiation sensitive devices may be made up of photo-resistive layers and/or radiation sensitive semiconductor elements, it is noted that the apparatus 10 could illustratively take the form of a mechanical scanner having a rotating disc with apertures disposed therein corresponding to the sub-portions of the subject portion, and the first and second background portions of the original or a television camera tube or a flying spot scanner system whose video output signal is selectively dissected to represent the first and second portions of the peripheral portion and the central subject portion of the viewed scene.

The radiation sensitive elements 15 have leads or electrical conductors which are connected to an auctioneering or selecting circuit 20 for selecting the one signal $X_i$ derived from the radiation sensitive devices 15 indicative of that discrete sub-portion of the original having the greatest (or maximum) density. It may be realized, that if the original is a negative, that the sub-portion of highest density is of primary interest and it may be represented by a transmittance signal of lowest magnitude, whereas if the original is a positive, radiation transmitted through the least dense sub-portion of the positive original is of primary interest and it may produce a transmittance signal of highest amplitude. For clarity, only a single lead has been shown conveying the plurality of signals from each of the radiation sensitive devices 15 to the auctioneering circuit 20. Auctioneering circuits per se are well known in the art. Illustratively, the auctioneering circuit 20 may take the form of that circuit described by H. H. Koppel in "Transistorized Elements and High Accuracy Control Loops," reprint No. T-11, Bailey Meter Company, (presented at the 17th annual automation conference, Oct. 15-18, 1962).

The output signal derived from the upper radiation sensitive device 12a is applied to a readout circuit 16 whereas the output signal derived from the lower radiation sensitive device 12b is applied to a readout circuit 18, to provide respectively first and second signals $D_U$ and $D_L$ indicative of the average or integrated value of radiation falling upon the upper and lower radiation sensitive devices 12a and 12b. In the array 10, the upper and lower radiation sensitive devices 12a and 12b may be either of a photoconductive or photovoltaic type provided that the circuits 16 and 18 are designed to give essentially logarithmic response, i.e., the first and second signals $D_U$ and $D_L$, are proportional to the density of the corresponding portions of the original.

The response of commonly known photoconductive cells is essentially logarithmic when operated with a high load resistance, and if used as part of the radiation sensitive apparatus 10, the readout circuits 16 and 18 may each illustratively take the form of a variable resistance in the order of 250K connected in series with the radiation sensitive devices 12a or 12b, respectively. The first and second signals, $D_U$ and $D_L$, of the readout circuits 16 and 18 may be derived from the common points between the upper and lower radiation sensitive devices 12a and 12b, and the variable resistance elements.

The first and second signals $D_U$ and $D_L$ derived from the readout circuits 16 and 18 are applied to each of a plurality of summing circuits (or coefficient amplifiers) 22, 24 and 26, and also to a background function computer or generator 28. Further, the selected third signal Xi derived from the auctioneering circuit 20 is applied to each of the summing circuits 22, 24 and 26. Illustratively, the summing amplifier 22, 24 and 26 may take the form of operational amplifiers whose output signals $C_b$, $C_n$, and $C_f$ are representative of the sum of the first, second and selcted third signals derived from the circuits 16, 18 and 20.

As indicated in drawings, the first, second and selected third signals applied from the circuits 16, 18 and 20 are applied to coefficient determining impedance elements $A_{u1}$, $A_{l1}$, and $A_{x1}$ to provide a coefficient or weighting factor to the signals derived from these respective circuits. In a similar manner, the input signals coupled to the summing amplifiers 24 and 26, are applied to variable impedance elements designated in a manner similar to that indicated above to provide selective coefficients to the input signals applied to these circuits.

Further, the first and second signals $D_U$ and $D_L$ are applied to the background function computer 28 to provide an output signal Z which is applied to a classification discriminator 30. As will be explained later, the background function computer 28 serves to sum the first and second signals $D_U$ and $D_L$ applied through the coefficient impedance elements $b_2$ and $b_3$, respectively, with the constant signal $b_1$, and it may take the form of a summing or operational amplifier. As shown in the drawing, three classification signals $C_b$, $C_n$ and $C_f$ derived respectively from the summing amplifiers 22, 24 and 26 are applied to the classification discriminator 30, which provides an exposure control signal C related or corresponding to one of the classification signals derived from the summing amplifier 22, 24 and 26 dependent upon the output signal Z derived from the background function computer 28. As indicated above, the exposure control signal C derived from the classification discriminator circuit 30 is applied to a printer interface circuit 32 for indicated or effecting the correct exposure of the print.

In the above-identified patent to Huboi, Palmer and Rising, U.S. Pat. No. 3,708,676, there is described apparatus for sensing radiation from the background portion and from the centrally disposed subject portion of the original to provide an exposure control signal for controlling the reproduction or printing of the original onto a radiation sensitive medium. As described therein, a signal indicative of the density corresponding to the average transmittance of the peripheral area of an original is provided and is designated as $D_O$. Further, a signal designated $X_i$ indicative of the maximum density of a discrete portion of the central or subject portion of the original is provided. As described therein, the signal $D_O$ and the signal indicative of the maximum density $X_l$ are summed by an appropriate summing amplifier to provide a signal represented by the following equation: $-V_c = K_0 + K_1 X_1 + K_2 D_0$ where $V_c$ is a voltage representing the classification of the original, $K_0$ is a constant, and $K_1$ and $K_2$ are coefficients. The signal $V_c$ may be used to classify or to control the exposure of the print as it is reproduced onto a radiation sensitive medium. More specifically, the signal may be used to predict density classification and/or color correction to correct the subject errors which are based on the large area transmission density (LATD) method of exposure determination.

In accordance with the teachings of this invention, the performance of the radiation sensitive apparatus described in the above-identified application may be improved by dividing or splitting the peripheral or perimetrical radiation sensitive element of the image reading mosaic array described therein into a first or upper radiation sensitive device for sensing the background portion of the original and a second or lower radiation sensitive device for sensing radiation derived from the lower foreground portion of the original. The object of dividing the perimetrical radiation sensitive element of the radiation sensitive apparatus is to determine the relationship between the radiation transmitted through the upper peripheral background portion and the lower peripheral foreground portion of the original and to use this information to improve the classification (or exposure) of an original bearing certain abnormal scenes.

As indicated above, the contents of an original may be classified in terms of its background or peripheral portion and its centrally disposed or subject portion. Difficulty may arise in determining the exposure for reproducing originals when the density relationship between the subject and the peripheral portions or between the upper and lower parts of the peripheral portion unexpectedly vary. For example, one type of difficulty is realized when the upper part of the peripheral portion is overly exposed, e.g., in backlighted portraits or in outdoor scenes where there is a bright sky in the upper part of the peripheral portion. Originals with such scenes usually require a very low classification so that the density balance is lighter than normal. However, in classifying originals with such scenes, the signal indicative of the maximum density of a discrete portion of the subject area may relate to the highly exposed upper portion, e.g., the sky, rather than to the principal subject of the original. As a result, the apparatus will provide a too high classification and the resultant print exposure will be too heavy because the maximum density signal from the subject portion is too high. Thus, the classification apparatus not only fails to compensate for the density subject failure of this type of scene, but in fact will provide a compensation of a type opposite to that which is required. An object of this invention is to detect originals with such abnormal scenes and to use the selected third signal indicative of the maximum density of the discrete sub-portion of the subject portion that bears a predetermined relationship to the densities of the remaining sub-portions in a different manner from that previously suggested, to reduce the print density and properly compensate for density subject failure.

The other category of scenes that will produce occasional density subject failure involves scenes in which the lower part of the peripheral portion is highly exposed with respect to the subject portion of the scene. For example, photographic originals may be taken at night in which a flash exposure is used to illuminate an object with the result that the principal object is correctly exposed whereas the foreground of the scene is overly exposed and the background of the scene is very dimly exposed. Typically, such originals are not given sufficient classification exposure because the classification coefficients used in the above-described apparatus had to compromise between the conflicting requirements of classifying the front lighted and backlighted scenes. The high contrast front lighted scenes, requiring extremely high density classification values, tend to have an opposite relation between the densities of the upper and lower perimetrical portions from those of the backlighted scenes. Thus, in accordance with the teachings of this invention, a distinction is made between the upper and lower parts of the perimetrical portion in order to provide correct adjustments for such front lighted scenes.

In accordance with the teachings of this invention, the first, peripheral, radiation sensitive element 12 of the radiation sensitive apparatus 10 is divided into first and second or upper and lower radiation sensitive devices 12a and 12b which serve to detect the difference in incident radiation and therefore the relative densities of the original (assuming the orientation of the original is appropriately controlled). As shown in the drawing, three sets of summing amplifiers 22, 24 and 26 and coefficient determining, impedance elements are provided to generate classification signals $C_n$, $C_b$ and $C_f$ for the exposure control or classification of originals carrying normal scenes, backlighted scenes and frontlighted scenes, respectively. In addition, the background function computer 28 serves to select and apply the particular classification signal dependent upon the type of scene which is viewed by the radiation sensitive apparatus 10. More specifically, the background function computer 28 generates a signal Z indicated by the following equation: $Z = b_1 + b_2 D_L - b_3 D_U$ where $b_1$ is a constant and $b_2$ and $b_3$ are coefficients, $D_U$ is the first signal derived from the readout circuit 16 and $D_L$ is the second signal derived from the readout circuit 18. As shown in FIG. 2, the scene discrimination signal Z is generated by the background function computer 28 and is applied to the classification discriminator 30 which provides an exposure control signal $C$ corresponding to one of the classification signals $C_b$, $C_n$ or $C_f$ derived from the summing amplifier 22, 24 or 26 dependent upon the scene discrimination signal Z. More particularly, if the scene discrimination signal Z is greater than a first discrimination limit $S_1$, the exposure control signal $C$ generated by the classification discriminator 30 will represent the classification signal $C_b$ generated by the summing amplifier 22 and will provide the appropriate correction for originals bearing scenes which are backlighted. If the scene discrimination signal Z is greater than or equal to a second discrimination limit $S_2$ and less than or equal to the first discrimination $S_1$, the classification discriminator 30 will generate an exposure control signal $C$ corresponding to the classification signal $C_n$ derived from the summing amplifier 24 to thereby provide a normal classification signal for scenes whose composition do not include upper and lower peripheral portions of great contrast. If the scene discrimination signal $Z$ is less than the second discrimination limit $S_2$, the exposure control signal $C$ generated by the classification discriminator 30 will correspond to the classification signal $C_f$ generated by the summing amplifier 26 to thereby correct for frontlighted scenes.

With regard to FIG. 2, the classification signals $C_b$, $C_n$ and $C_f$ derived from each of the summing amplifiers 22, 24, and 26, respectively are effected by a special set of coefficients as determined by the impedance elements $A_{ui}$, $A_{li}$ and $A_{xi}$ (where $i = 1, 2$ or $3$) which provide each of the classification signals for a particular type of scene. For example, the summing amplifier 22 provides the classification signal $C_b$ to provide classification correction for a backlighted scene according to the following equation:

$$C_b = a_1 + a_{u1} D_U + a_{l1} D_L + a_{x1} X.$$

The output signal $C_n$ derived from the summing amplifier 24 provides classification correction for a substantially normal scene according to the following equation:

$$C_n = a_2 + a_{u2} D_U + a_{l2} D_L + a_{x2} X.$$

Further, summing amplifier 26 provides an output signal of $C_f$ providing classification correction for a high contrast frontlighted scene according to the equation:

$$C_f = a_3 + a_{u3} D_U + a_{e3} D_L + a_{x3} X.$$

In the above given equations, $C_b$, $C_n$ and $C_f$ are classification signals derived from the summing amplifiers 22, 24 and 26; $a_1$, $a_2$ and $a_3$ are constant input signals, $a_{ui}$, $a_{li}$ and $a_{xi}$ ($i = 1, 2$ or $3$) are coefficients determined by the impedance elements $A_{ui}$, $A_{li}$ and $A_{xi}$, and $X_i$ is the selected third signal derived from the auctioneering circuit 20. The coefficients $a_{ui}$, $a_{li}$ and $a_{xi}$ may be selectively chosen with respect to value and polarity.

While the three separate equations listed above are shown in the drawing as being derived from three separate summing amplifiers 22, 24 and 26, it should be understood that a single coefficient summing amplifier or unit could be used with three sets of coefficient impedance networks selected by a background discriminator.

The coefficients for the above-identified equations and the discrimination limits $S_1$ and $S_2$ can be determined by statistical anglysis by analyzing originals from a large population of originals to be printed. From experience, it has been noted that the coefficients may vary according to the season and that there may be slight changes in the coefficients for those used during the winter and summer seasons for example. However, the operation of the coefficients to increase or decrease the exposure of a print according to the three equations listed above, may be summarized as follows for an illustrative sample of negative originals:

|  | $D_U$ | $D_L$ | $X$ |
|---|---|---|---|
| Normal | $a_{u2}$ is of a negative value | $a_{l2}$ is of a negative value | $a_{x2}$ is of a positive value |
| Backlighted | $a_{u1}$ is of more negative value than $a_{u2}$ | $a_{l1}$ is equal to or of a less negative value than $a_{l2}$ | $a_{x1}$ is of a less positive value than $a_{x2}$ |
| Frontlighted | $a_{u3}$ is equal to or more of a negative value than $a_{u2}$ | $a_{l3}$ is equal to or of a less negative value than $a_{l2}$ | $a_{x3}$ is of a more positive value than $a_{x2}$ |

In the foregoing chart, it is assumed that normally the principal subject is related to the central portion of the scene, the lower peripheral portion may include the principal subject, e.g., in flash scenes, and that the upper peripheral portion seldom includes the principal subject. Thus, for a backlighted scene in which the upper peripheral density and/or the maximum density of the subject portion may read erroneously high, the differences between the coefficients with respect to the coefficients used for the normal equation, provide a print that is lighter or less exposed than normal for backlighted scenes. Conversely, the different coefficients indicated for the high contrast, frontlighted scenes having relatively low upper density and/or high lower density will result in greater exposures of the original to provide darker prints than normal. The magnitude of the differences between the coefficients for each type of scene is dependent on the sample of the originals and is interdependent with the constant terms $a_1$, $a_2$ and $a_3$ which may be selectively adjusted to provide appropriate bias in the print density for each category.

Though this invention has been described and shown in terms of a three equation system, i.e., three equations to provide exposure classification for frontlighted, normal and backlighted scenes respectively, it may be understood that the invention could operate with two equations and that one of the summing amplifiers and its set of coefficient elements could be deleted. For example, the summing amplifier 24 and the set of coefficient elements $A_{u2}$, $A_{12}$ and $A_{x2}$ could be deleted, and the sets of coefficient elements associated with the summing amplifiers 22 and 26 could be adjusted to compensate for a normally lighted scene.

Figure 3:
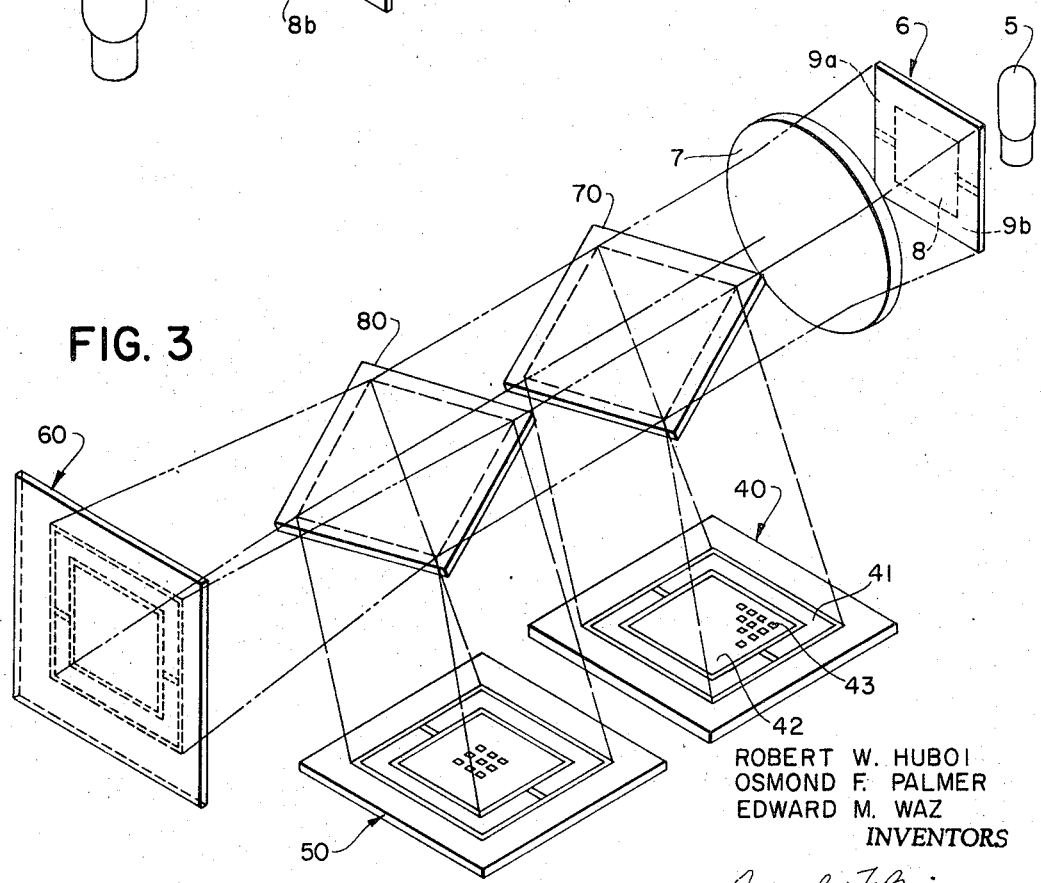
FIG. 3 is a schematic diagram in perspective of a plurality of radiation sensitive apparatus in which the image of the original is projected onto each of the radiation sensitive apparatus of the present invention.

Thus, there has been shown apparatus for sensing radiation derived from various portions of an image to classify or control the exposure of an original onto a radiation sensitive medium in order to compensate for various abnormal scenes of the original. Further, though this apparatus has been described for correcting subject density failure, it is understood that this apparatus may be adapted to provide classification signals for color subject failure in a manner similar to that described in the above-identified U.S. Pat. No. 3,708,676. As shown in FIG. 3, the apparatus described herein may be modified, as indicated in the above-identified application to provide separate color density (R, G and B) measurements from the upper and lower peripheral portions and the maximum density of the central or subject portion, more accurate identification of certain types of color subject failure may be achieved. Negative originals having scenes with predominating green grass in the foreground or lower background portions of the scene will be evidenced by relatively high green density in the lower background portion; blue sky scenes would result in relatively high blue density in the upper peripheral portion; wood panelling would be evidenced by relatively high red density and low blue density in the upper peripheral portion; and so forth. For example, a color measuring system may include three radiation sensing arrays 40, 50 and 60, each similar to the radiation sensitive apparatus 10 of FIG. 2, with red, green and blue color separating dichroic filters 70 and 80 disposed to transmit red, green and blue light onto the separate radiation sensitive arrays 40, 50 and 60 respectively.

As shown in FIG. 3, an original 6 may be illuminated by a source 5 radiation, and the image may be projected by a lens 7 and the dichroic filters 70 and 80 onto the separate radiation sensitive arrays 40, 50 and 60. The radiation sensitive arrays 40, 50 and 60 are substantially similar to the radiation sensitive apparatus 10 of FIG. 2. For example, the radiation sensitive array 40 includes a peripheral radiation sensitive element 41 and a distinct central radiation sensitive element 42 consisting of a plurality of radiation sensitive devices 43, each responsive to the radiation transmitted by discrete sub-portions of the central subject portion 8 of the original 6. Though not shown in FIG. 3, suitable readout circuits 16 and 18, auctioneering circuit 20, summing amplifiers 22, 24 and 26, function computers 28, classification discriminators 30, and printer interface circuits 32 as described above with respect to FIG. 2 are connected to each of the radiation sensitive arrays 40, 50 and 60 to provide exposure control signals for each of the primary colors red, green and blue. Each exposure control signal may reflect the detection of normal or uniform color density distribution in the original or may reflect the abnormal color density distributions known as color subject failure that may occur in any of the three primary colors.

By providing separate color measurements as described in U.S. Pat. No. 3,708,676 and determining separate upper and lower perimetrical densities as well as separate central-maximum densities for each color, a broader range of scene classifications can be determined to correct for color subject failure and density subject failure.

The invention has been described in detail with particular reference to the preferred embodiment thereof, but it will be understood that variations and modifications can be effected within the spirit and scope of the invention.

We claim:

1. In a photographic printer, exposure control apparatus for producing an exposure control signal which may be used to control the making of a print from a photographic original, comprising;
    photoelectric means for examining the optical densities of a photographic original from which a print is to be made, said original having a distinct central portion and distinct first and second portions of the remaining distinct peripheral portion and for producing (a) a first signal which is a function of the average density of said first peripheral portion of said original, (b) a second signal which is a function of the average density of said second peripheral portion of said original and (c) a plurality of third signals each of said third signals being a function of the density of one of a corresponding plurality of discrete subportions of said central portion of said original;
    means responsive to said plurality of third signals for selecting that third signal which is a function of an extreme density of a corresponding discrete subportion of said central portion of said original and for producing a fourth signal which is a function of said selected third signal; and
    means resonsive to said first signal, said second signal and said fourth signal for producing an exposure control signal which may be used to control the exposure of the photographic original in said photographic printer.

2. The apparatus of claim 1 wherein said means responsive to said plurality of third signals selects the third signal which is a function of the maximum density of a discrete subportion of said distinct central portion of said photographic original.

3. In a photographic printer, exposure control apparatus for producing an exposure control signal which may be used to control the making of a print from a photographic original, comprising:
    photoelectric means for examining the optical densities of a photographic original from which a print is to be made, said original having a distinct central portion and distinct first and second portions of the remaining distinct peripheral portion and for producing (a) a first signal which is a function of the average density of said first peripheral portion of said original, (b) a second signal which is a function of the average density of said second peripheral portion of said original; and (c) a plurality of third signals each of said third signals being a function of the densities of one of a corresponding plurality of discrete subportions of the central subject portion of said original;
    image discrimination means responsive to the first and second signals for producing an image discrimination signal indicative of the classification of the image as (a) a backlighted image in response to a first predetermined relationship between the first and second signals, (b) a normally lighted image in response to a second predetermined relationship between the first and second signals, or (c) a front-lighted image in response to a third predetermined relationship between the first and second signals;
    means responsive to said plurality of third signals for selecting that third signal which is a function of an extreme density of a corresponding discrete subportion of the central portion of the photographic original and for producing a fourth signal which is a function of said selected third signal; and
    means responsive to said image classification signal and said first, second and fourth signals for producing an exposure control signal which may be used to control the exposure of the photographic original in said photographic printer.

4. The apparatus of claim 3 wherein said photoelectric means includes a first photoelectric device for examining the optical density of the first peripheral portion of said photographic original and for producing said first signal which is a function of the average density of said first peripheral portion;
    a second photoelectric device for examining the optical density of the second peripheral portion of said photographic original and for producing said second signal which is a function of the average optical density of said second peripheral portion; and
    a plurality of third photoelectric devices for examining a plurality of discrete subportions of the central subject portion of said photographic original and for producing a plurality of third signals, respectively a function of the optical density of said plurality of discrete subportions.

5. In a photographic printer, exposure control apparatus for producing an exposure control signal which may be used to control the making of aprint from a photographic original, comprising:
    photoelectric means for examining the optical densities of a photographic original from which a print is to be made, said original having a distinct central portion and distinct first and second portions of the remaining distinct peripheral portion and for producing (a) a first signal which is a function of the average density of said first peripheral portion of said original, (b) a second signal which is a function of the average density of said second peripheral portion of said original; and (c) a plurality of third signals each of said third signals being a function of the densities of one of a corresponding plurality of discrete subportions of the central subject portion of said original;

image discrimination means responsive to the first and second signals for producing an image discrimination signal indicative of the classification of the image as (a) a backlighted image in response to a first predetermined relationship between the first and second signals, (b) a normally lighted image in response to a second predetermined relationship between the first and second signals, or (c) a front-lighted image in response to a third predetermined relationship between the first and second signals;

means responsive to said plurality of third signals for selecting that third signal which is a function of an extreme density of a corresponding discrete subportion of the central portion of the photographic original and for producing a fourth signal which is a function of said selected third signal; and first means responsive to the first, second and fourth signals for producing a first image classification signal for reproducing a backlighted image;

second means responsive to the first, second and fourth signals for producing a second image classification signal for reproducing a normally illuminated image;

third means responsive to the first, second and fourth signals for producing a third image classification signal for reproducing a frontlighted image; and exposure control signal generating means responsive to the image discrimination signal for selecting the corresponding first, second or third image classification signal and for producing an exposure control signal which is a function of the selected image classification signal.

6. A method of producing in a photographic printer an exposure control signal which may be used to control the making of a print from a photographic original having a distinct central portion and distinct first and second portions of the remaining distinct peripheral portion, comprising:

determining the average density of the first portion of the peripheral portion of the original and producing a first signal which is a function of such density;

determining the average density of the second portion of the peripheral portion of the original and producing a second signal which is a function of such density;

determining the density of each one of a plurality of distinct subportions of the distinct, central portion of the original and producing a plurality of third signals each a function of the density of a corresponding subportion of the central portion of the original;

selecting that third signal of the plurality of thirds signals which is a function of a corresponding subportion exhibiting a density that bears a predetermined relationship to the remaining densities of the remaining unselected discrete subportions and producing a fourth signal which is a function of said selected third signal; and combining the first, second and fourth signals and producing an exposure control signal which may be used to control the exposure of the photographic original in a photographic printer.

7. A method of producing in a photographic printer an exposure control signal which may be used to control the making of a print from a photographic original having a scene in accordance with the exposure classification of the original as having a backlighted scene, a normally lighted scene, or a front-lighted scene, and as a function of the average densities of distinct first and second portions of a distinct peripheral portion of the scene, generally corresponding to the upper background and lower foreground, respectively, of the scene, and as a function of the density of a selected discrete subportion of the remaining distinct, central, subject portion of the scene bearing a predetermined relationship of the remaining densities of the remaining subportions, said method comprising the steps of:

a. directing radiation through the original, whereby the variable density of the scene on the original varies the intensity of the radiation transmitted by the original;

b. sensing the intensity of the radiation transmitted by the first portion of the peripheral portion of the scene and producing a first signal indicative of the density of the first portion;

c. sensing the intensity of the radiation transmitted by the second portion of the peripheral portion of the scene and producing a second signal indicative of the density of the second portion;

d. sensing the radiation transmitted by a plurality of discrete subportions of the remaining distinct, central, subject portion of the scene and producing a plurality of third signals each indicative of the density of each respective subportion of the central subject portion of the scene;

e. selecting the third signal of the plurality of third signals indicative of a corresponding subportion exhibiting a density that bears a predetermined relationship to the remaining densities of the remaining unselected discrete subportions;

f. combining the first, second and selected third signals to produce a first classification signal indicative of a back-lighted scene, wherein the density of the upper background of the scene exceeds the density of the lower foreground of the scene;

g. combining the first, second and selected third signals to produce a second classification signal indicative of a normally illuminated scene, wherein the densities of the upper background and lower foreground of the scene are approximately equal;

h. combining the first, second and selected third signals to produce a third classification signal indicative of a front-lighted scene, wherein the density of the lower foreground of the scene exceeds the density of the upper background of the scene;

i. combining the first and second signals to produce a scene discrimination signal responsive to the relative densities of the upper background and lower foreground of the scene, represented by the first and second signals, respectively; and j. in response to the scene discrimination signal, selecting the corresponding first, second or third classification signal and producing an exposure control signal which is a function of said selected classification signal.

8. A method of producing in a photographic printer an exposure control signal which may be used to control the making of a print from a photographic original in accordance with the exposure classification of the original as having a backlighted scene, a normally lighted scene or a frontlighted scene, and as a function of the average densities of distinct first and second portions of a distinct peripheral portion of the scene, generally corresponding to the upper background and lower foreground, respectively, of the scene, and and as a function of the densities of discrete subportions of the remaining distinct, central, subject portion of the scene on the original, said method comprising the steps of:

a. directing radiation through said original, whereby the variable density of the scene on the original varies the intensity or radiation transmitted by the original;

b. sensing the intensity of radiation transmitted by the first portion of the peripheral portion of the scene on the original and producing a first signal indicative of the density of the first portion;

c. sensing the intensity of the radiation transmitted by the second portion of the peripheral portion of the scene on the original and producing a second signal indicative of the density of the second portion;

d. sensing the radiation transmitted by a plurality of distinct subportions of the remaining distinct, central subject portion of the scene on the original and producing a plurality of third signals each indicative of the density of each respective subportion of the central subject portion of the scene;

e. selecting the third signal of the plurality of third signals indicative of a corresponding subportion exhibiting a density that differs, in a predetermined relationship, with respect to the densities of the remaining subportions of the central subject portion of the original;

f. providing first and second scene discrimination limit signals;

g. combining the first, second and selected third signals to produce a first classification signal indicative of a back-lighted scene, a second classification signal indicative of a normally illuminated scene, and a third classification signal indicative of a frontlighted scene;

h. combining the first and second signals to produce a scene discrimination signal responsive to the relative densities of the upper background and lower foreground of the scene;

i. combining the scene discrimination signal with the first and second scene discrimination limit signals and the first, second and third exposure classification signals to produce an exposure control signal corresponding to one of the first, second or third classification signals in response to the relationship between the scene discrimination signal and the first and second scene discrimination limit signals.

9. A method of producing in a photographic printer an exposure control signal which may be used to control the exposure of radiation sensitive copy material to first and second wavelengths of radiation transmitted by a scene on an original as a function of the densities of a plurality of discrete subportions of a distinct, central, subject portion of the scene on the original and as a function of the densities of distinct first and second portions of the remaining peripheral portion of the scene on the original, said method comprising the steps of:

a. directing first and second wavelengths of radiation through the scene on the original, whereby the variable density of the scene on the original varies the intensity of the first and second wavelengths of radiation transmitted by the scene;

b. sensing the intensity of the first wavelength of radiation directed through the first portion of the scene and producing a first signal indicative of the density, measured with respect to the first wavelength of radiation, of the first portion;

c. sensing the intensity of the second wavelength of radiation directed through the first portion of the scene and producing a second signal indicative of the density, measured with respect to the second wavelength of radiation, of the first portion;

d. sensing the intensity of the first wavelength of radiation directed through the second portion of the scene and producing a third signal indicative of the density, measured with respect to the first wavelength of radiation of the second portion;

e. sensing the intensity of the second wavelength of radiation directed through the second portion of the scene and producing a fourth signal indicative of the density, measured with respect to the second wavelength of radiation of the second portion;

f. sensing the first wavelength of radiation directed through the plurality of distinct subportions of the distinct, central, subject portion of the scene and producing a plurality of fifth signals each indicative of the density, measured with respect to the first wavelength of radiation, of each respective subportion of the central subject portion of the scene on the original;

g. sensing the second wavelength of radiation directed through the plurality of distinct subportions of the distinct, central, subject portion of the scene and producing a plurality of sixth signals each indicative of the density, measured with respect to the second wavelength of radiation, of each respective subportion of the central subject portion of the scene on the original;

h. producing a first exposure control signal which may be used to control the exposure of the radiation sensitive copy material to the first wavelength of radiation directed through the scene on the original in response to the first and third signals indicative of the densities of the first and second portions, respectively, of the scene, and in response to one of the plurality of fifth signals indicative of the corresponding subportion exhibiting a density that differs from the densities of the remaining subportions of the central subject portion of the scene on the original; and i. producing a second exposure control signal which may be used to control the exposure of the radiation sensitive copy material to the second wavelength of radiation directed through the scene on the original in response to the second and fourth signals each indicative of the densities of the first and second portions, respectively, of the scene, and in response to one of the plurality of sixth signals indicative of the corresponding subportion exhibiting a density that differs from the densities of the remaining subportions of the central subject portion of the scene on the original.

* * * * *